(12) United States Patent
Bae et al.

(10) Patent No.: US 12,693,398 B2
(45) Date of Patent: Jul. 28, 2026

(54) TAG, INTERROGATOR, AND SYSTEM FOR PERFORMING POSITION MEASUREMENT BASED ON BACKSCATTER IN MILLIMETER-WAVE BAND

(71) Applicant: KOREA ADVANCED INSTITUTE OF SCIENCE AND TECHNOLOGY, Daejeon (KR)

(72) Inventors: Kang Min Bae, Daejeon (KR); Hankyeol Moon, Daejeon (KR); Song Min Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 264 days.

(21) Appl. No.: 18/501,592

(22) Filed: Nov. 3, 2023

(65) Prior Publication Data

US 2024/0142596 A1    May 2, 2024

(30) Foreign Application Priority Data

Nov. 4, 2022    (KR) ........................ 10-2022-0146399
Jun. 16, 2023    (KR) ........................ 10-2023-0077736

(51) Int. Cl.
| | |
|---|---|
| *G01S 13/34* | (2006.01) |
| *G01S 7/35* | (2006.01) |
| *G01S 13/02* | (2006.01) |
| *G01S 13/32* | (2006.01) |
| *G01S 13/75* | (2006.01) |
| *G01S 13/82* | (2006.01) |

(52) U.S. Cl.
CPC ............ *G01S 13/34* (2013.01); *G01S 13/325* (2013.01); *G01S 13/758* (2013.01); (Continued)

(58) Field of Classification Search
CPC ...... G01S 13/34; G01S 13/325; G01S 13/758; G01S 13/825; G01S 7/356; (Continued)

(56) References Cited

U.S. PATENT DOCUMENTS 5,254,997 A * 10/1993 Cohn ............... G06K 19/07749
342/51
11,474,233 B2 10/2022 Hester et al.
(Continued)

FOREIGN PATENT DOCUMENTS

| JP | 2007-68088 A | 3/2007 |
|---|---|---|
| KR | 10-1964135 B1 | 4/2019 |
| WO | 2021/0405594 A1 | 3/2021 |

OTHER PUBLICATIONS

Kang Min Bae, et al., "OmniScatter: extreme sensitivity mmWave backscattering using commodity FMCW radar," Proceedings of the 2023 Conference on Human Information Interaction and Retrieval, ACMPUB27, Jun. 27, 2022, pp. 316-329 (14 pages total).
(Continued)

*Primary Examiner* — Jack W Keith
*Assistant Examiner* — Clayton Paul Ridder
(74) *Attorney, Agent, or Firm* — Sughrue Mion, PLLC

(57) ABSTRACT

Provided are a tag, interrogator, and system for performing position measurement based on backscatter in a millimeter-wave band. In detail, provided is a tag including a planar Van Atta array antenna, a frequency-shift keying (FSK) modulator connected to the planar Van Atta array antenna, and at least one bias circuit connected to the FSK modulator, wherein the FSK modulator is configured to, based on an interrogation signal being received by the planar Van Atta array antenna, modulate the interrogation signal based on a control signal supplied through the at least one bias circuit, and output the modulated interrogation signal in a direction from which the interrogation signal is received, through the planar Van Atta array antenna.

12 Claims, 11 Drawing Sheets

(52) U.S. Cl.
CPC ............. *G01S 13/825* (2013.01); *G01S 7/356*
(2021.05); *G01S 2013/0263* (2013.01)

(58) Field of Classification Search
CPC ........... G01S 2013/0263; G06K 7/086; G06K
7/10009; G06K 19/072; G06K 19/07773;
G06K 19/07786; G06K 19/0672
See application file for complete search history.

(56) References Cited

U.S. PATENT DOCUMENTS

| | | | |
|---|---|---|---|
| 2002/0128052 A1* | 9/2002 | Neagley | H01Q 3/2647 |
| | | | 455/575.1 |
| 2004/0263390 A1* | 12/2004 | Merenda | H01Q 1/241 |
| | | | 343/700 MS |
| 2010/0188211 A1* | 7/2010 | Brommer | G06K 19/0675 |
| | | | 340/539.32 |
| 2012/0289338 A1 | 11/2012 | Chen et al. | |
| 2021/0096236 A1 | 4/2021 | Choi et al. | |
| 2022/0244374 A1* | 8/2022 | Soltanaghaei | G01S 13/75 |
| 2024/0088957 A1* | 3/2024 | Wang | G06K 19/0723 |

OTHER PUBLICATIONS

Extended European Search Report issued Mar. 6, 2024 in Application No. 23207339.5.
Kang Min Bae et al., "Hawkeye: Hectometer-range Subcentimeter Localization for Large-scale mmWave Backscatter," MobiSys '23, Jun. 18-22, 2023, 14 pages, ACM, Helsinki, Finland.

* cited by examiner

120a

TAG a

110

Tx

Rx

INTERROGATOR

120n

TAG n

———— : INTERROGATION SIGNAL
—·—· : FIRST BACKSCATTER SIGNAL
—··— : SECOND BACKSCATTER SIGNAL

| Reflected wave |
|----------------|
| Incident wave  |

410

210

B

A'

A

B'

| Reflected wave |
|----------------|
| Incident wave  |

TAG, INTERROGATOR, AND SYSTEM FOR PERFORMING POSITION MEASUREMENT BASED ON BACKSCATTER IN MILLIMETER-WAVE BAND

CROSS-REFERENCE TO RELATED APPLICATION

This application is based on and claims priority under 35 U.S.C. § 119 to Korean Patent Application No. 10-2022-0146399, filed on Nov. 4, 2022, in the Korean Intellectual Property Office, and Korean Patent Application No. 10-2023-0077736, filed on Jun. 16, 2023, in the Korean Intellectual Property Office, the disclosures of which are incorporated by reference herein in their entireties.

BACKGROUND

1. Field

The disclosure relates to a tag, an interrogator, and a system for performing position measurement based on backscatter in a millimeter-wave band.

This research was supported by the Samsung Future Technology Promotion Project [SRFC-IT2101-06].

2. Description of the Related Art

A review of the development of mobile communication from generation to generation shows that the development has mostly been directed to technologies for services targeting humans, such as voice-based services, multimedia services, and data services. It is expected that connected devices that are exponentially increasing after commercialization of $5^{th}$ generation (5G) communication systems will be connected to communication networks. Examples of things connected to networks may include vehicles, robots, drones, home appliances, displays, smart sensors connected to various infrastructures, construction machines, and factory equipment. Mobile devices are expected to evolve into various form factors, such as augmented reality glasses, virtual reality headsets, and hologram devices. In order to provide various services by connecting hundreds of billions of devices and things in the $6^{th}$ generation (6G) era, there have been ongoing efforts to develop improved 6G communication systems. For these reasons, 6G communication systems are referred to as Beyond-5G systems.

In the Beyond-5G systems, the importance of Internet-of-Things (IoT) technology for connecting more objects to each other may increase. In order to effectively connect objects to each other, it is necessary to measure the positions of the objects first. To this end, there is a need to develop a technique for determining the positions of a large number of objects at once with low power.

SUMMARY

Additional aspects will be set forth in part in the description which follows and, in part, will be apparent from the description, or may be learned by practice of the presented embodiments of the disclosure.

According to an embodiment, a tag for performing position measurement based on backscatter in a millimeter-wave band may include a planar Van Atta array antenna, a frequency-shift keying (FSK) modulator connected to the planar Van Atta array antenna, and at least one bias circuit connected to the FSK modulator. According to an embodiment, the FSK modulator may be configured to, based on an interrogation signal being received by the planar Van Atta array antenna, modulate the interrogation signal based on a control signal supplied through the at least one bias circuit. According to an embodiment, the FSK modulator may be configured to output the modulated interrogation signal in a direction from which the interrogation signal is received, through the planar Van Atta array antenna.

According to an embodiment, an interrogator for performing position measurement based on backscatter in a millimeter-wave band may include a transceiver and at least one processor connected to the transceiver. According to an embodiment, the at least one processor may be configured to output an interrogation signal including continuous unit chirp signals that change from a first frequency to a second frequency. According to an embodiment, the at least one processor may be further configured to receive a backscattered tag signal from a tag that has received the output interrogation signal. According to an embodiment, the at least one processor may be further configured to measure a position of the tag by identifying FSK modulation applied to the backscattered tag signal.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a diagram for describing a planar Van Atta array antenna for performing retroreflection, according to an embodiment;

DETAILED DESCRIPTION

Figure 1:
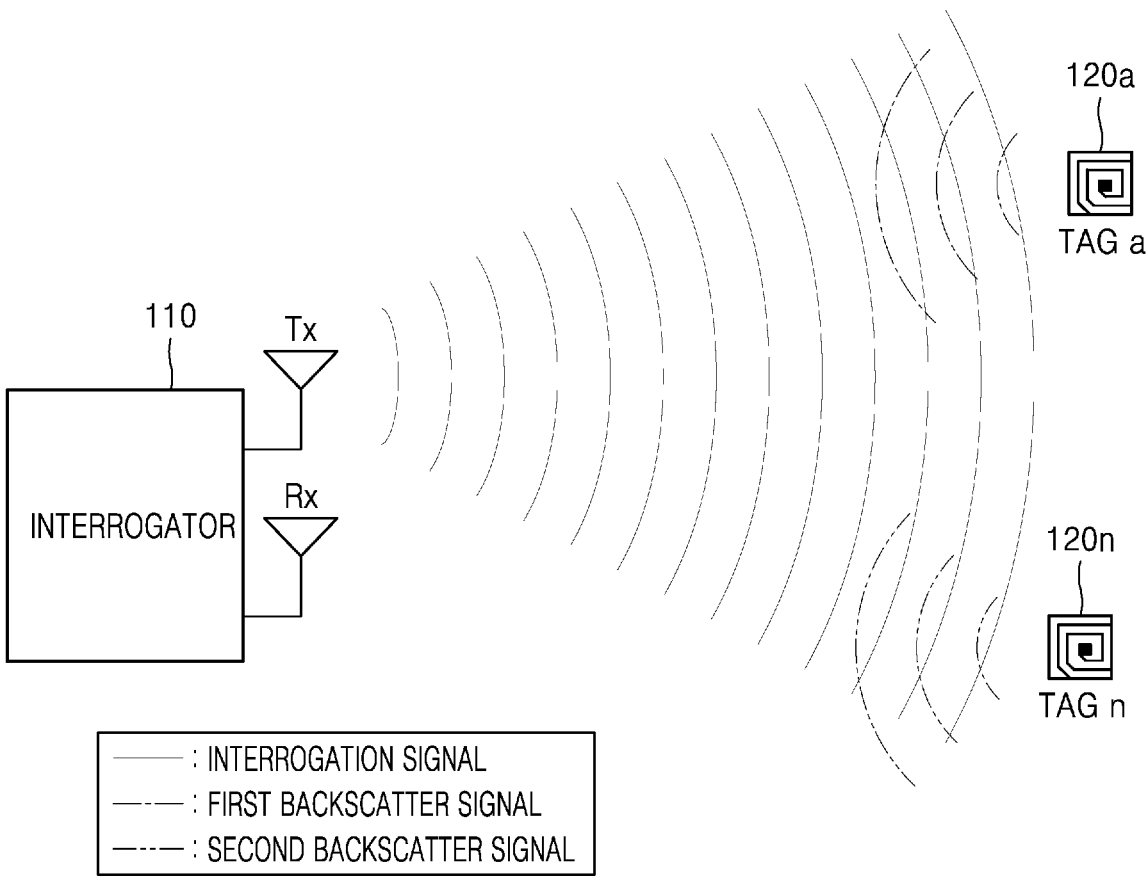
FIG. 1 is a diagram for describing a position measurement system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As the disclosure allows for various changes and numerous embodiments, particular embodiments will be illustrated in the drawings and described in detail. However, this is not intended to limit the disclosure to modes of practice, and it should be understood that all changes, equivalents, and substitutes that do not depart from the spirit and technical scope of the disclosure are encompassed in the disclosure.

In describing the disclosure, detailed descriptions of the related art will be omitted when it is deemed that they may unnecessarily obscure the gist of the disclosure. Also, ordinal numerals (e.g., 'first', 'second', and the like) used in the description of the specification are identifier codes for distinguishing one component from another.

Also, in the disclosure, it should be understood that when components are "connected" or "coupled" to each other, the components may be directly connected or coupled to each other, but may alternatively be connected or coupled to each other with a component therebetween, unless specified otherwise.

Also, as used herein, a component expressed as, for example, ' . . . er (or)', ' . . . unit', ' . . . module', or the like, may denote a unit in which two or more components are combined into one component or one component is divided into two or more components according to its function. In addition, each component to be described below may additionally perform, in addition to its primary function, some or all of functions of other components take charge of, and some functions among primary functions of the respective components may be exclusively performed by other components.

In addition, the disclosure is also applicable to other position measurement systems through some modifications within a range that does not largely depart from the scope of the disclosure based on determination by a skilled person.

Here, it may be understood that each block in processing flowchart drawings and combinations of flowchart drawings may be performed by computer program instructions. These computer program instructions may be loaded in a processor of a general-purpose computer, a particular-purpose computer, or other programmable data processing equipment, and thus, the instructions performed by a processor of a computer or other programmable data processing equipment may generate a means configured to perform functions described in flowchart block(s). These computer program instructions may also be stored in a computer-usable or computer-readable memory capable of orienting a computer or other programmable data processing equipment to implement a function in a particular mode, and thus, the instructions stored in the computer-usable or computer-readable memory may also produce a production item involving an instruction means configured to perform a function described in flowchart block(s). The computer program instructions may also be loaded in a computer or other programmable data processing equipment, and thus, a computer-executable process may also be generated by performing a series of operation steps on the computer or the other programmable data processing equipment so that the instructions executed in the computer or the other programmable data processing equipment provide steps for executing functions described in flowchart block(s).

In addition, each block may indicate a portion of a module, a segment, or a code including one or more executable instructions for executing particular logical function(s). Also, in several alternative embodiments, functions described in blocks may also be out of a sequence. For example, two consecutively illustrated blocks may be substantially performed at the same time in fact, or the blocks may be sometimes performed in a reverse order according to a corresponding function.

FIG. 1 is a diagram for describing a position measurement system according to an embodiment.

Referring to FIG. 1, the position measurement system may include an interrogator 110 and at least one tag (e.g., a tag a 120a and a tag n 120n).

The position measurement system according to an embodiment may measure the position of an object with low power by using a tag (e.g., 120a) configured to perform millimeter-wave (mmwave) backscattering. In addition, when the position measurement system outputs an interrogation signal by using a high-definition frequency-modulated continuous-wave (HD-FMCW), the position measurement system may accurately determine the positions of a plurality of widely distributed objects by improving the signal-to-noise ratio (SNR) of signals reflected and returned from the objects. The HD-FMCW has a form in which chirp signals whose frequency changes linearly during a unit time are repeated. However, this is only an example, and the interrogation signal output from the interrogator 110 according to the disclosure is not limited to the HD-FMCW. For example, the interrogation signal may include an FMCW or another type of signal (e.g., a CW signal).

The interrogator 110 may generate an interrogation signal by repeating chirp signals whose frequency changes linearly during a unit time. The interrogator 110 may output the generated interrogation signal to a wide area where objects is located. Each of the tags 120a and 120n located on objects may output a backscatter signal in a direction from which the interrogation signal is received. Each of the tags 120a and 120n located on the objects may output a backscatter signal through a Van Atta array antenna. For example, the tag a 120a may output a first backscatter signal, and the tag n 120n may output a second backscatter signal.

Each of the tags 120a and 120n may perform frequency-shift keying (FSK) modulation on an interrogation signal incident at a particular frequency. Accordingly, the first backscatter signal and the second backscatter signal may have been applied with FSK modulation at frequencies preset for the tag a 120a and the tag n 120n, respectively.

When the backscatter signal output from each of the tags 120a and 120n is received, the interrogator 110 may identify an FSK-modulated frequency from the backscatter signal. The interrogator 110 may measure the positions of the tag a 120a and the tag n 120n based on results of the identification.

The position measurement system according to the disclosure may measure the position of an object in sub-centimeters. In addition, the position measurement system according to the disclosure may measure the positions of a plurality of tags at once. For example, the position measurement system according to the disclosure may measure the positions of 1024 tags by transmitting an interrogation signal once.

Figure 2:
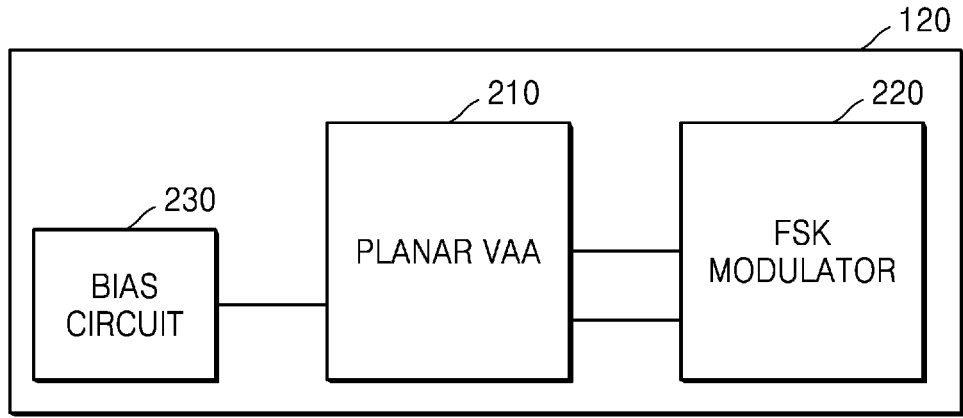
FIG. 2 is a block diagram for describing a tag according to an embodiment.

FIG. 2 is a block diagram for describing a tag 120 according to an embodiment.

Referring to FIG. 2, the tag 120 may include a planar Van Atta array antenna 210, an FSK modulator 220, and at least one bias circuit 230. However, the components of the tag 120 are not limited to the above-described examples. For example, the tag 120 may include more components than the above-described components. In an embodiment, the Van Atta array antenna 210, the FSK modulator 220, and the bias circuit 230 may be implemented as a single chip.

The tag 120 may perform ultra-low-power communication through backscattering. For example, the tag 120 may perform communication with a power of at least 10 microwatts (μW) but less than 100 μW, through backscattering. The tag 120 may transmit an incident signal as an output signal through backscattering. Accordingly, the tag 120 may perform communication with low power consumption by omitting a process of generating a passband signal.

The planar Van Atta array antenna 210 may achieve retroreflection by passively reflecting a signal in the direction of arrival. The planar Van Atta array antenna 210 may retroreflect interrogation signals incident on an azimuth plane and an elevation plane. The interrogation signals may be retroreflected from the azimuth plane and the elevation plane, respectively.

A signal output from the planar Van Atta array antenna 210 may be transmitted to the FSK modulator 220. The FSK modulator 220 may perform frequency modulation by shifting the phase of the signal received from the planar Van Atta array antenna 210 by 180°. A tag signal with a shifted frequency may be generated by the FSK modulator 220 from an incident interrogation signal. The tag signal may have a different frequency from that of the interrogation signal. Accordingly, the interrogator 110 that receives the tag signal may easily separate the tag signal and clutter noise from each other.

Meanwhile, the planar Van Atta array antenna 210 may include a plurality of antenna elements. The plurality of antenna elements may be paired such that retroreflection characteristics are maintained. A plurality of pairs of antenna elements may be connected to each other through transmission lines. Here, the FSK modulator 220 may be connected to each pair. A structure of the tag 120 according to an embodiment will be described in detail below with reference to FIG. 4.

The at least one bias circuit 230 may supply a control signal to the FSK modulator 220. The at least one bias circuit 230 may supply a control signal to cause the FSK modulator 220 to perform FSK modulation on an interrogation signal received by the planar Van Atta array antenna 210. The at least one bias circuit 230 may be connected to a power supply that is external to the tag 120. However, this is only an embodiment, and a power source may be included in the tag 120.

The control signal provided by the at least one bias circuit 230 may cause the FSK modulator 220 to modulate the interrogation signal. The modulated interrogation signal may be output through the planar Van Atta array antenna 210 in a direction from which the interrogation signal is received.

Figure 3:
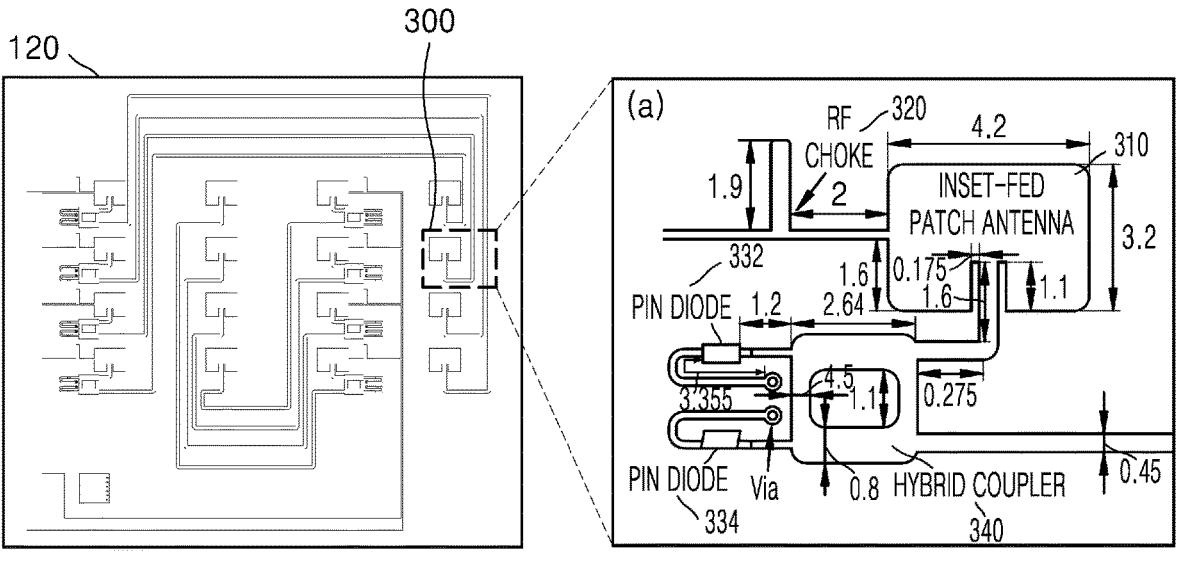
FIG. 3 is a diagram for describing in more detail a structure of a tag according to an embodiment.

FIG. 3 is a diagram for describing in more detail a structure of the tag 120 according to an embodiment.

FIG. 3 illustrates the tag 120 including a 4×4 planar Van Atta array. In the 4×4 planar Van Atta array antenna, each element 300 of the tag 120 may include an inset-fed patch antenna 310 and a radio-frequency (RF) choke 320. In addition, each element 300 may include an FSK modulator including a plurality of pin diodes 332 and 334 and a hybrid coupler 340. However, the tag 120 of the disclosure is not limited to that illustrated in FIG. 3. For example, the tag 120 may include more or fewer components than the above-described components.

For retroreflection, centrosymmetric antenna pairs in the 4×4 planar Van Atta array antenna may be connected to transmission lines. Transmission lines adjacent to each other may have a length difference equal to multiples of length $\lambda_g$ of a guided wavelength so as to satisfy a Van Atta array condition of phase reversal between the centrosymmetric antenna pairs.

An incident signal may be incident on the inset-fed patch antenna 310. When the incident signal is incident, the inset-fed patch antenna 310 may output a reflected signal. A control signal for performing FSK modulation on the reflected signal output from the inset-fed patch antenna 310 may be applied to each element 300. The RF choke 320 is a circuit through which a control signal is transmitted, and may prevent incident signals from leaking out. The FSK modulator may perform FSK modulation on the reflected signal based on the control signal input to the element 300. At this time, a frequency to be FSK-modulated may be a fixed value for each tag 120 or may be changed by a control signal.

The tag 120 according to an embodiment may be designed to support the entire bandwidth (e.g., 250 MHz) in the 24-GHz frequency band. For example, in order to prevent phase misalignment and induce accurate retroreflection, the tag 120 may be designed based on 24.125 GHz, which is the center frequency in the 24-GHz frequency band, and $\lambda_g$=7.56 mm.

Phase misalignment may also be caused by length differences between the transmission lines. In the tag 120 according to an embodiment, the difference between the longest transmission line and the shortest transmission line may be limited to $9\lambda_g$ in order to minimize phase misalignment due to the length differences between the transmission lines. A transmission line length difference of $9\lambda_g$ and a frequency offset of 125 MHz may result in a phase misalignment of 16.9°. When a phase misalignment of 16.9° occurs, the tag 120 may cause a power loss of 0.05 dB across the entire bandwidth.

Meanwhile, the 4×4 Van Atta array illustrated in the embodiment of FIG. 3 is an example to which the disclosure may be applied. The tag 120 for position measurement may be implemented by more or fewer Van Atta arrays. As the number of elements 300 constituting the Van Atta array increases, the accuracy of position measurement may be improved.

Figure 4:
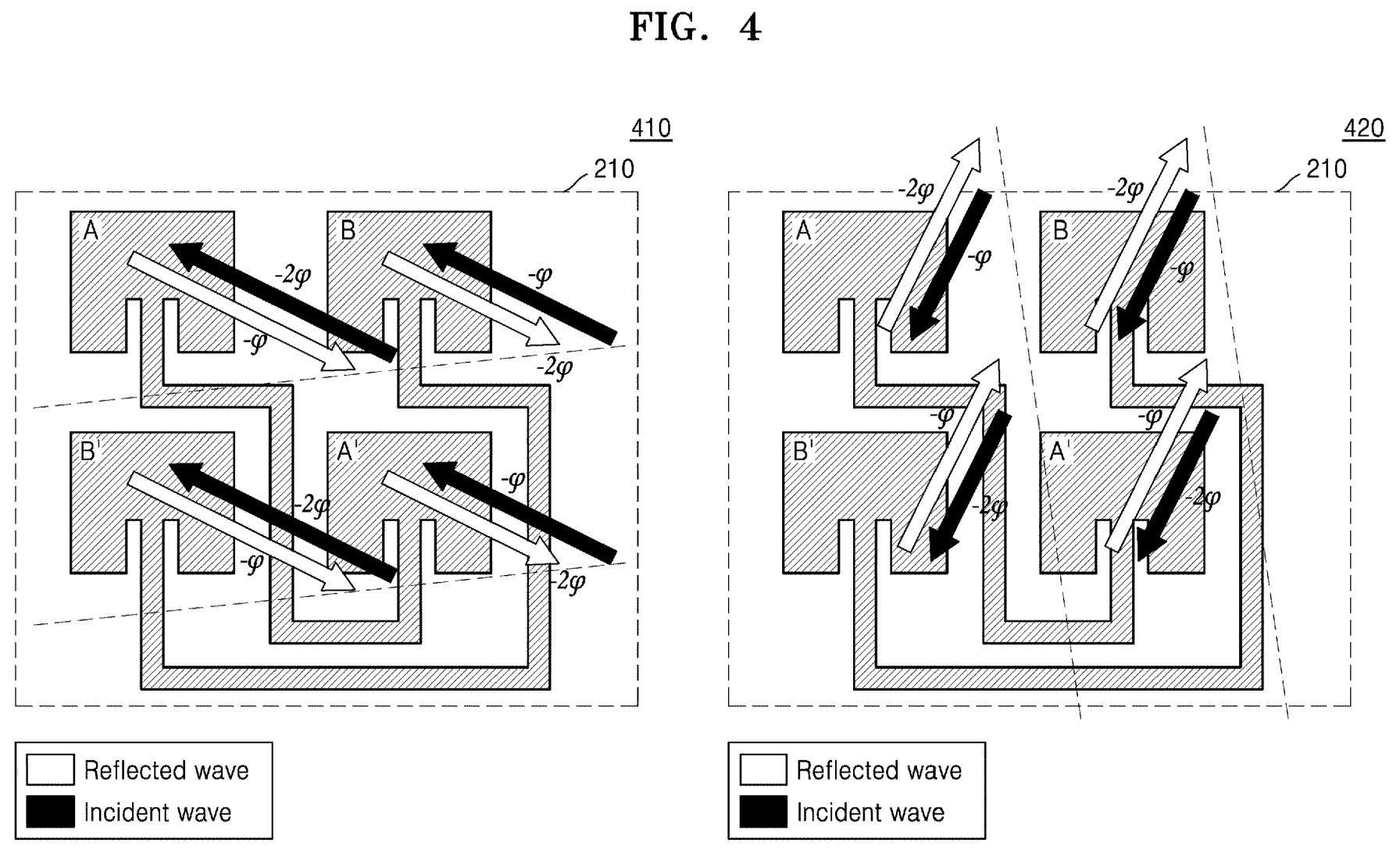

FIG. 4 is a diagram for describing a planar Van Atta array antenna for performing retroreflection, according to an embodiment.

The planar Van Atta array antenna 210 may achieve retroreflection by passively reflecting an incident signal in the direction of arrival. The planar Van Atta array antenna 210 may be a simple antenna array in which symmetric pairs of antennas are connected to transmission lines whose lengths differ from each other by guided wavelengths. The planar Van Atta array antenna 210 may reverse a phase sequence of an incident signal in antenna pairs symmetrically connected to each other. The planar Van Atta array antenna 210 may equally apply a phase induced by the transmission lines to all of the transmission lines. Accordingly, the radiation direction of the planar Van Atta array antenna 210 may not be affected by the phase induced by the transmission lines.

Referring to FIG. 4, the planar Van Atta array antenna 210 may include four antenna elements connected to each other. The antenna elements may be connected to each other through transmission lines having lengths that are multiples of $\lambda_g$. The planar Van Atta array antenna 210 may reverse the phase sequence after a propagation delay in the transmission lines. The planar Van Atta array antenna 210 may achieve retroreflection in both an azimuth plane 410 and an elevation plane 420.

For example, when a signal is incident on the azimuth plane 410, the phase sequence of the incident signal incident on antenna elements of [A, B] and antenna elements of [B', A'] may be reversed from [−2ψ, −ψ] to [−2ψ]. Accordingly, the planar Van Atta array antenna 210 may achieve retroreflection from the azimuth plane by outputting a reflected signal in the direction of incidence. In addition, when a signal is incident on the elevation plane 420, the phase sequences of the incident signal at antenna elements of [A, B'] and antenna elements of [B, A'] may be [−ψ, −2ψ] and [−ψ, −2ψ], respectively, and the phase sequences of an output signal may be [−2ψ, −ψ] and [−2ψ, −ψ], respectively. Accordingly, the planar Van Atta array antenna 210 may achieve retroreflection in the elevation plane 420.

Figure 5:
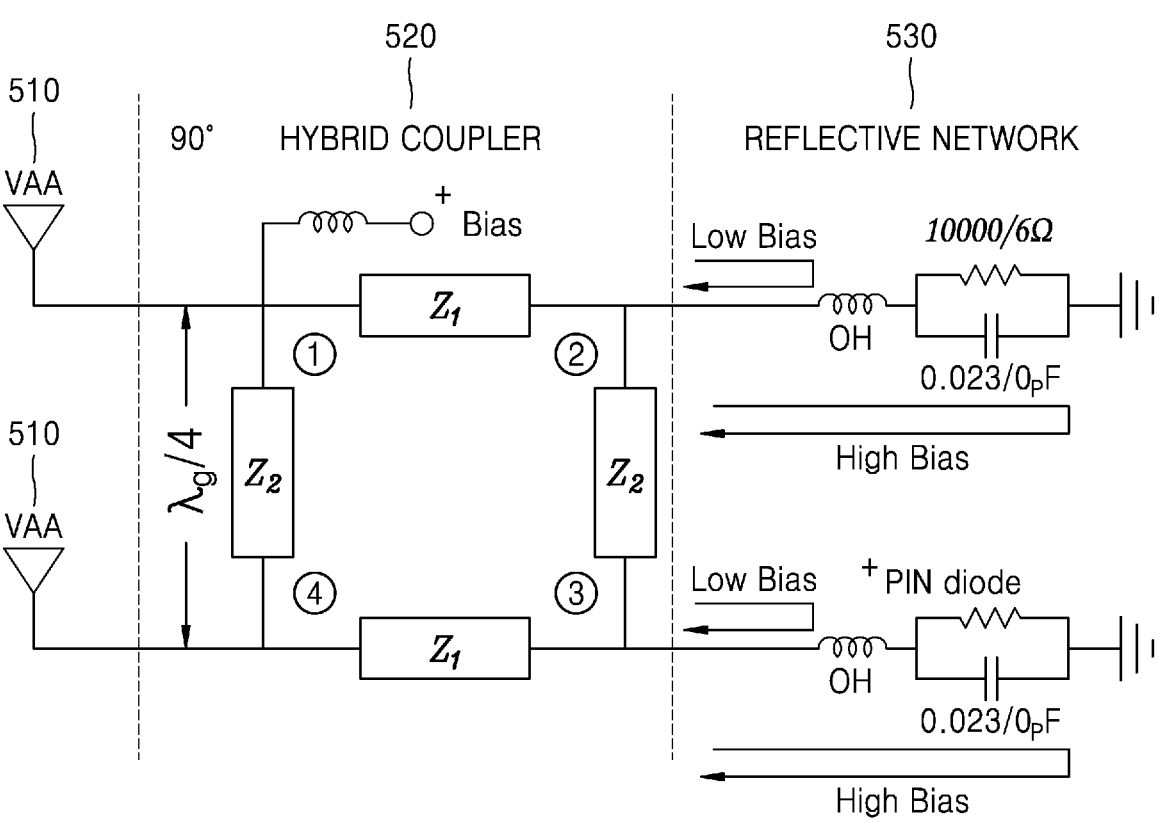
FIG. 5 is a diagram for describing a frequency-shift keying (FSK) modulator according to an embodiment.

FIG. 5 is a diagram for describing the FSK modulator 220 according to an embodiment.

Referring to FIG. 5, a centrosymmetric antenna pair 510 may be connected to by a 90° hybrid coupler 520. For example, in the 4×4 Van Atta array described above with reference to FIG. 3, eight centrosymmetric antenna pairs 510 may be provided, and the 90° hybrid coupler 520 may be provided for each antenna pair 510. In addition, the 90° hybrid coupler 520 may be connected to two symmetric reflective networks 530. Accordingly, the 90° hybrid coupler 520 may achieve FSK modulation through a 180° phase shift.

The reflective network 530 may shift a phase by 180° depending on the length of the signal path. The reflective network 530 may determine the phase of an output signal. The phase of the output signal may be determined as an OFF state when a low bias is applied to the reflective network, and as an ON state when a high bias is applied to the reflective network. The reflective network 530 may generate a tag signal through periodic phase shifts.

Unlike the existing technology in which the power of an incident signal is reduced by nearly half, the tag according to an embodiment may reduce the power loss of an incident signal through the FSK modulation method described above. In addition, the tag according to an embodiment modulates a frequency by using only two PIN diodes per element, thereby reducing implementation costs compared to the existing technology.

In order to combine a planar Van Atta array antenna with an FSK modulator such that retroreflection characteristics are maintained, it is important to prevent RF signals from leaking out. This may be performed by the RF choke connected to the Van Atta array antenna, as described above with reference to FIG. 3.

A signal flow in the centrosymmetric pairs 510 of antennas will be described in detail with reference to FIG. 5. In the centrosymmetric antenna pair 510, an incident signal incident on an upper antenna (port ①) may be output from a lower antenna (port ④). In order to maintain Van Atta array performance even after FSK modulation, the 90° hybrid coupler 520 may minimize signal loss between port ① and port ④ through impedance matching. The incident signal may be divided into four paths by the 90° hybrid coupler 520. The four paths are as follows.

Path 1: ①->②->①
Path 2: ①->③->①
Path 3: ①->②->④
Path 4: ①->③->④

A diagonally delivered signal (e.g., from port ① to port ③) may additionally obtain a phase of 90° compared to a horizontally delivered signal (e.g., from port ① to port ②). This may lead to a 180° phase shift between path 1 and path 2. The signals of path 1 and path 2 offset each other such that no signal is not output from the upper antenna. Meanwhile, there is no phase difference between path 3 and path 4. Accordingly, the signals may be summed up to the maximum and output from the lower antenna.

Figure 6:
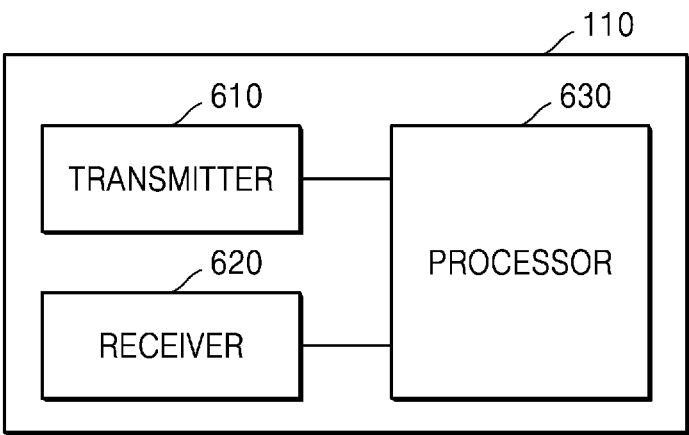
FIG. 6 is a block diagram of an interrogator according to an embodiment.

FIG. 6 is a block diagram of the interrogator 110 according to an embodiment.

Referring to FIG. 6, the interrogator 110 may include a transmitter 610, a receiver 620, and a processor 630. However, the components of the interrogator 110 are not limited to the above-described examples. For example, the interrogator 110 may include more or fewer components than the above-described components. In an embodiment, the transmitter 610, the receiver 620, and the processor 630 may be implemented as a single chip. In addition, the processor 630 may include one or more processors.

The transmitter 610 of the interrogator 110 and the receiver 620 of the interrogator 110 may be collectively referred to as a transceiver, which may be implemented as the planar Van Atta array antenna described above with reference to FIGS. 1 to 5.

The interrogator 110 according to an embodiment may further include a memory (not shown). The memory (not shown) may store a program and data necessary for the operation of the interrogator 110. In addition, the memory (not shown) may store FSK modulation information, the position of a tag, and the like, which are identified from a tag signal received by the interrogator 110. The memory (not shown) may not be a separate component and may be included in the processor 630. The memory (not shown) may include a volatile memory, a nonvolatile memory, or a combination of a volatile memory and a nonvolatile memory. In addition, the memory may provide data stored therein at a request of the processor 630. For example, the memory may store information about a frequency used for FSK modulation by each of a plurality of tags.

The processor 630 may control a series of operations to allow the interrogator 110 to operate according to the above-described embodiments. For example, the processor 630 may transmit an interrogation signal through the transmitter 610, receive a tag signal from a tag through the receiver 610, and process the received tag signal to measure the position of the tag.

The interrogator 110 according to an embodiment may include a signal generator configured to generate an interrogation signal, a signal splitter configured to split the signal generated by the signal generator, and a demodulation unit configured to perform demodulation on a received tag signal. The demodulation unit may include a mixer configured to mix an interrogation signal with a received tag signal, and a Fourier transformer configured to Fourier transform the mixed signal.

For example, the mixer may mix an interrogation signal split by the signal splitter with a tag signal received from the tag to generate an intermediate signal IF. The mixer may generate the intermediate signal IF by multiplying a tag signal TS by an interrogation signal IS. The intermediate signal may be separated into a signal having a frequency component corresponding to the sum of the frequencies of the two signals, and a signal having a frequency component corresponding to the difference between the frequencies of the two signals.

The demodulation unit may identify a frequency used for FSK modulation by the tag, from the intermediate signal IF. The demodulation unit may remove the frequency used for FSK modulation from the intermediate signal IF. Thereafter, the demodulation unit may measure the position of the tag by identifying a propagation delay between the interrogator 110 and the tag.

Figure 7:
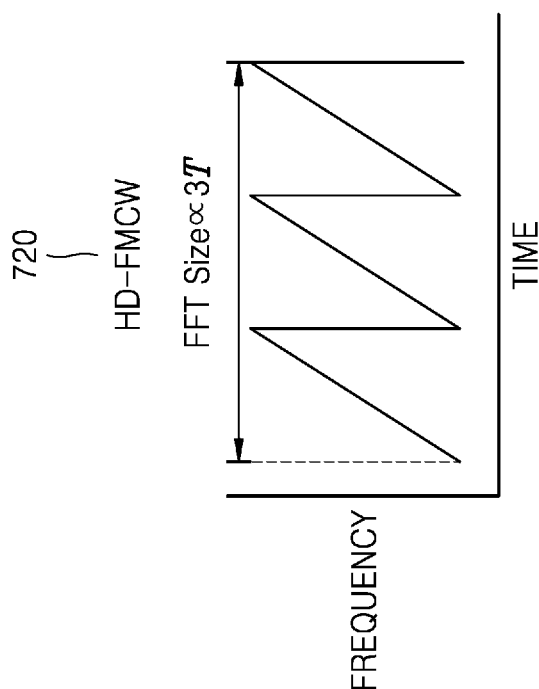
FIG. 7 is a diagram illustrating a change in frequency of an interrogation signal over time, according to an embodiment.
Figure 7:
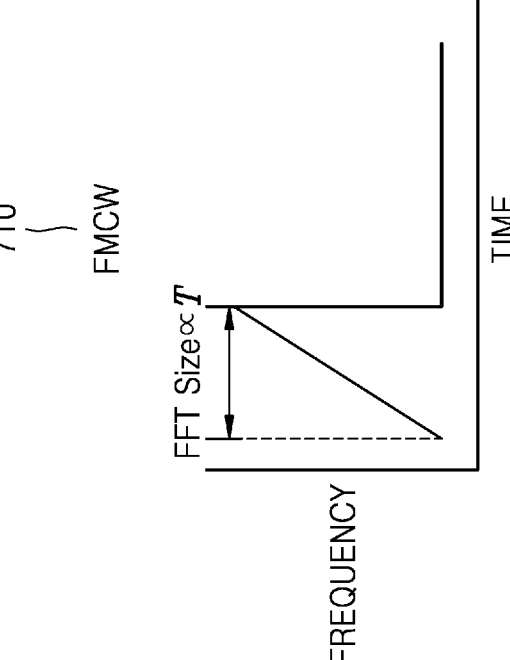

FIG. 7 is a diagram illustrating a change in frequency of an interrogation signal over time, according to an embodiment.

Referring to FIG. 7, an FMCW signal 710 and an HD-FMCW signal 720 may be confirmed. The FMCW signal 710 may include one unit chirp signal that changes from a first frequency f1 to a second frequency f2. In addition, the HD-FMCW signal 720 may be a signal in which a unit chirp signal is repeated for a certain period.

The interrogator 110 according to an embodiment may use HD-FMCW technology that uses a periodic chirp signal, unlike an existing FMCW that uses a single chirp signal. When the interrogator 110 uses the HD-FMCW signal 720, an FSK signal may be effectively separated from clutter noise. When the interrogator 110 effectively separates the FSK signal from the clutter noise, the SNR may be improved. The interrogation signal generated by the interrogator 110 may be expressed by Equation 1 below.

$$s(t) = c(t) * \sum_{n=1}^{N} \delta(t - nT), \qquad \text{[Equation 1]}$$

In Equation 1 above, c(t) may denote a chirp signal. In Equation 1 above, N may denote the number of chirp repetitions. In Equation 1 above, s(t−Δt) may denote a reflected interrogation signal. In Equation 1, Δt may denote a round-trip propagation delay between the interrogator 110 and a clutter. In Equation 1 above, T may denote the period of a delayed signal. According to Equation 1 above, a plurality of frequencies in the delayed signal may be indicated as peaks. For example, frequencies having values of multiples of (1/T) Hz in the delayed signal may be indicated as peaks. The other frequencies in the delayed signal may be indicated as 0. That is, clutter noise generated due to reflection of the interrogation signal of the interrogator 110 may be concentrated in the same set of frequency bins, and may remain as 0 for the other bins.

A tag signal generated as a result of performing FSK modulation on a signal output from the planar Van Atta array 210 may be expressed as Equation 2 below.

$$s(t - \Delta t) \cdot e^{j2\pi f_m \varepsilon}, \qquad \text{\{Equation 2\}}$$

In Equation 2, $f_m$ denotes an FSK modulation frequency. The period of the tag signal by FSK modulation may be calculated as the least common multiple of T and (1/$f_m$).

Figure 8:
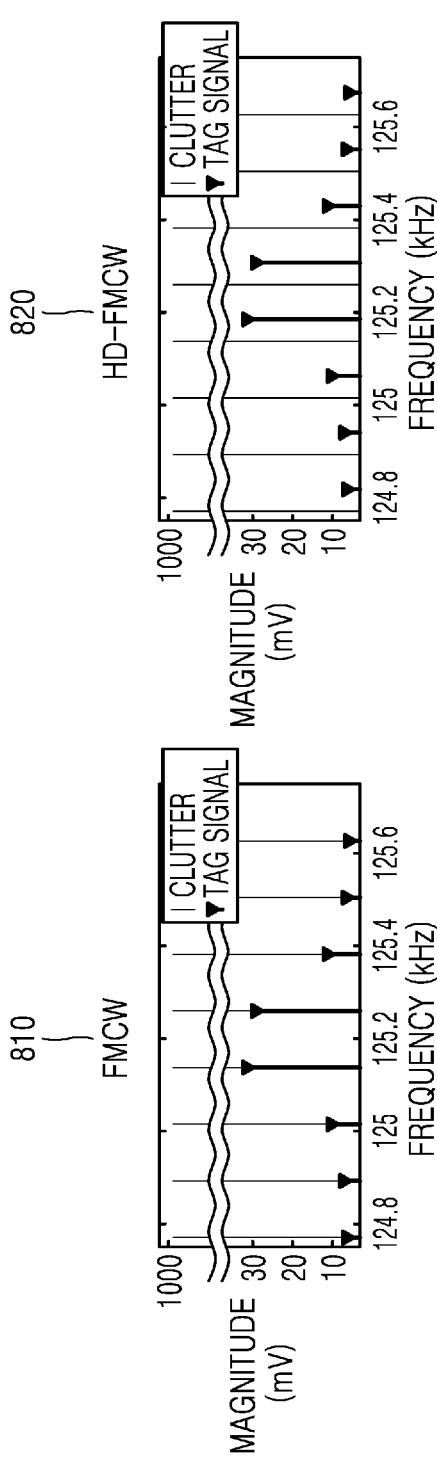
FIG. 8 is a diagram for describing signal components and clutter noise components received when using an interrogation signal, according to an embodiment.

FIG. 8 is a diagram for describing signal components and clutter noise components received when using an interrogation signal, according to an embodiment.

Due to the characteristics of a Fourier transform for a periodic signal including a tag signal and clutter noise components, a result of Fourier transforming the periodic signal may be expressed as bins in a discrete frequency domain.

Referring to FIG. 8, it may be seen that, when an FMCW signal 810 is used as an interrogation signal, clutter noise and a tag signal are generated at the same frequency. In this case, the interrogator 110 cannot separate the clutter noise and the tag signal, and thus, the SNR may have a significantly low value.

On the other hand, the interrogator 110 according to an embodiment may use an HD-FMCW signal 820 including continuous unit chirp signals as an interrogation signal, as described above. It may be seen that, when the HD-FMCW signal 820 is used as an interrogation signal, a tag signal and clutter noise are separated in the frequency domain. Through this, the interrogator 110 may obtain the tag signal with a high SNR value.

Figure 9:
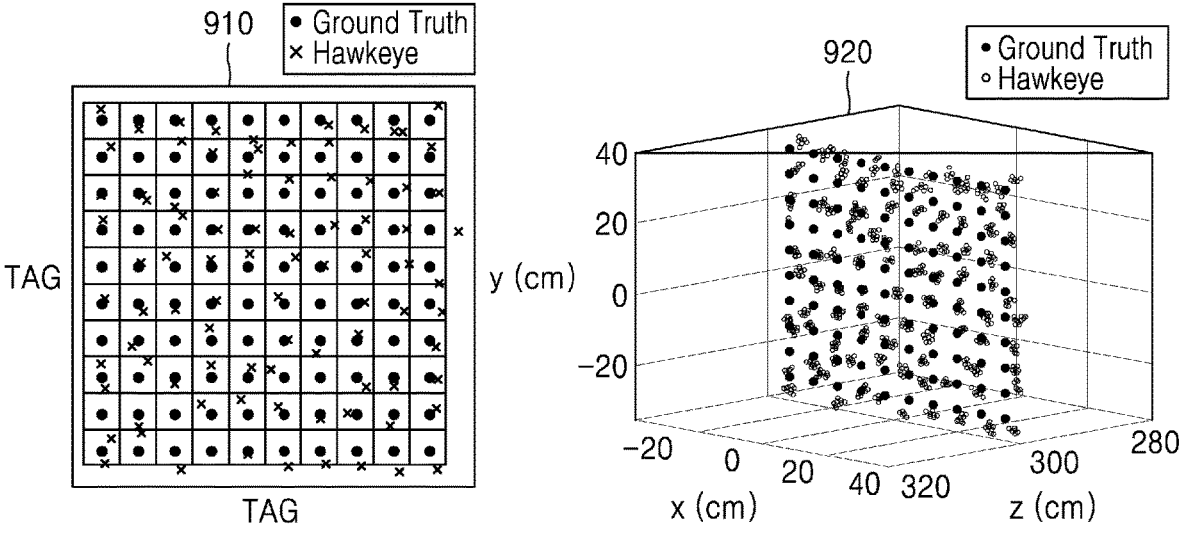
FIG. 9 is a diagram for describing accuracy of measurement of the position of a tag, according to an embodiment.

FIG. 9 is a diagram for describing accuracy of measurement of the position of a tag, according to an embodiment.

In order to check the accuracy of measurement of the positions of tags, 100 tags were placed on an acrylic board, and results of measuring their respective positions are shown in FIG. 9. When the interrogator 110 according to an embodiment transmits an interrogation signal, the 100 tags on the acrylic board may perform FSK modulation on the received interrogation signal at respective frequencies and then output a tag signal in a direction from which the interrogation signal is received.

As shown in FIG. 9, it may be seen that, despite the situation where the 100 tags are located significantly densely, the interrogator 110 according to an embodiment measures the position of each tag with high accuracy.

Figure 10:
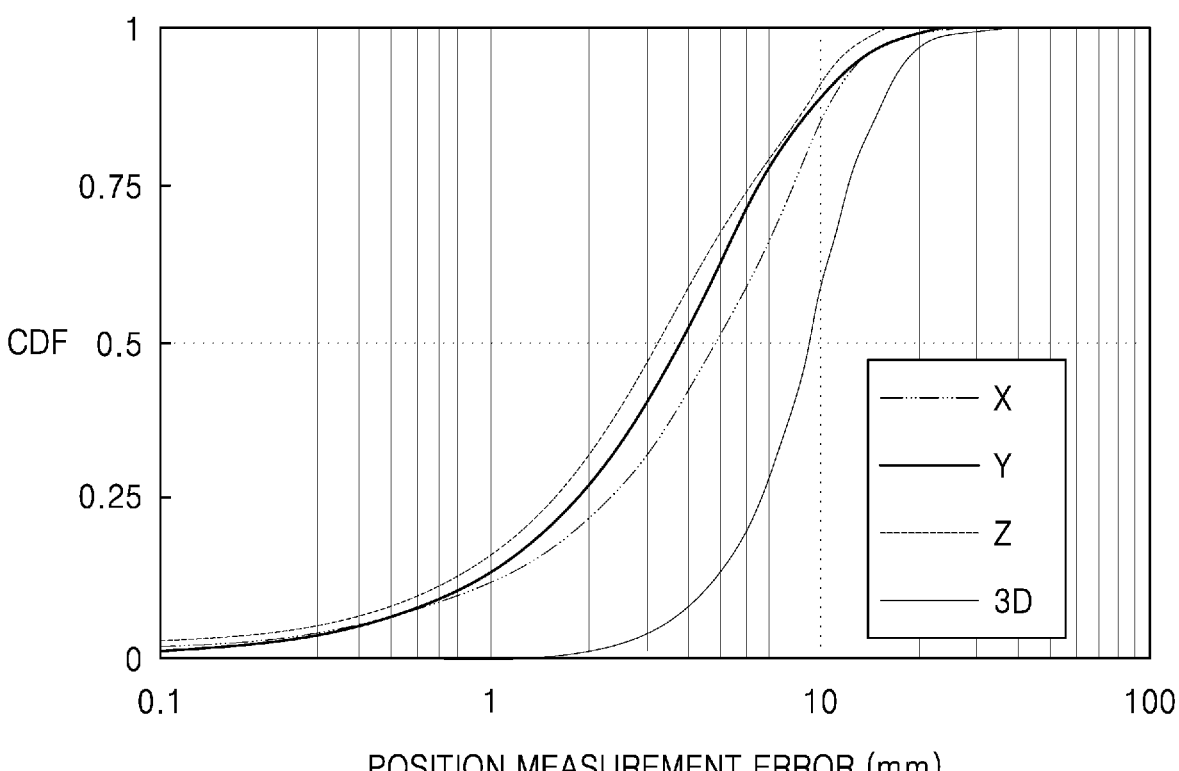
FIG. 10 is a graph for describing tag position measurement errors according to an embodiment.

FIG. 10 is a graph for describing tag position measurement errors according to an embodiment.

FIG. 10 shows a cumulative distribution function (CDF) graph of position measurement errors. According to the CDF graph, it may be seen that the average error is 8.99 mm and the 90% error is 13.8 mm. In addition, for dimensions of x, y, and z, the average errors are 5.9 mm, 2.7 mm, and 3.4 mm, and the 90% errors are 11.2 mm, 8.5 mm, and 8.8 mm, respectively.

Through the graph of FIG. 10, it may be seen that the three-dimensional (3D) position recognition accuracy of the position measurement device proposed in the disclosure is in sub-cm units and thus significantly high.

Figure 11:
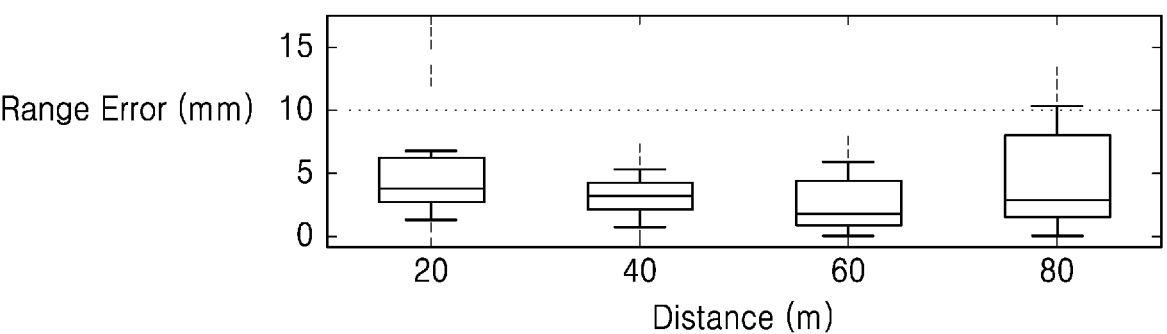
FIG. 11 is a graph for describing tag position measurement errors in a multi-path environment, according to an embodiment.

FIG. 11 is a graph for describing tag position measurement errors in a multi-path environment, according to an embodiment.

The graph of FIG. 11 shows position measurement errors measured when tags are located every 20 m over a straight-line distance of 80 m. Here, 50 experimental tests were performed at 10 different tag positions. From the graph of FIG. 11, it may be seen that retroreflection of the tag according to the disclosure effectively suppresses multi-path, showing high sub-cm accuracy even in a complex indoor environment.

Position measurement technology using millimeter waves has an issue that the power of a backscattered signal is low compared to the power of clutter noise due to surrounding reflection in a millimeter wave spectrum, and thus is vulnerable to errors. Thus, the disclosure provides a position measurement device and system for effectively separating clutter noise and a backscattered signal, and accurately identifying the position of a tag that has generated the backscattered signal.

According to an embodiment, a tag for performing position measurement based on backscatter in a millimeter-wave band may include a planar Van Atta array antenna, an FSK modulator connected to the planar Van Atta array antenna, and at least one bias circuit connected to the FSK modulator. According to an embodiment, the FSK modulator may be configured to, based on an interrogation signal being received by the planar Van Atta array antenna, modulate the interrogation signal based on a control signal supplied through the at least one bias circuit. According to an embodiment, the FSK modulator may be configured to output the modulated interrogation signal in a direction from which the interrogation signal is received, through the planar Van Atta array antenna.

In an embodiment, the FSK modulator may perform FSK modulation by inducing periodic 180° shifts of the phase of the interrogation signal.

According to an embodiment, the FSK modulator may include a 90° hybrid coupler. According to an embodiment, the FSK modulator may include a reflective network connected to the 90° hybrid coupler and including a plurality of PIN diodes.

According to an embodiment, the 90° hybrid coupler may be configured to deliver the interrogation signal through a first path, a second path, a third path, and a fourth path. According to an embodiment, among the interrogation signal, a first signal delivered through the first path and a second signal delivered through the second path may be induced to undergo a 180° phase shift with respect to each other to offset each other. According to an embodiment, among the interrogation signal, a third signal delivered through the third path and a fourth signal delivered through the fourth path may have no phase difference therebetween, and thus may be summed up to a maximum and output.

According to an embodiment, the tag may further include an RF choke arranged between the at least one bias circuit and the Van Atta array antenna to prevent leakage of the interrogation signal received by the Van Atta array antenna.

According to an embodiment, the interrogation signal may include continuous unit chirp signals that change from a first frequency to a second frequency.

According to an embodiment, the Van Atta array antenna may include a plurality of antenna elements. According to an embodiment, the plurality of antenna elements may include centrosymmetric antenna element pairs for retroreflection. According to an embodiment, a first antenna element and a second antenna element included in each of the antenna element pairs may be connected to transmission lines having a length difference equal to multiples of length $\lambda_g$ of a guided wavelength of the interrogation signal.

According to an embodiment, an interrogator for performing position measurement based on backscatter in a millimeter-wave band may include a transceiver and at least one processor connected to the transceiver. According to an embodiment, the at least one processor may be configured to output an interrogation signal including continuous unit chirp signals that change from a first frequency to a second frequency. According to an embodiment, the at least one processor may be further configured to receive a backscattered tag signal from a tag that has received the output interrogation signal. According to an embodiment, the at least one processor may be further configured to measure a position of the tag by identifying FSK modulation applied to the backscattered tag signal.

According to an embodiment, the tag signal may be applied with the FSK modulation to induce periodic 180° shifts of a phase of the output interrogation signal.

According to an embodiment, the interrogation signal may belong to a millimeter-wave band.

According to an embodiment, the at least one processor may be further configured to mix the interrogation signal with the tag signal to generate an intermediate signal. According to an embodiment, the at least one processor may be further configured to perform a fast Fourier transform (FFT) on the intermediate signal.

According to an embodiment, a system for performing position measurement based on backscatter in a millimeter-wave band may include an interrogator configured to output an interrogation signal including continuous unit chirp signals that change from a first frequency to a second frequency. According to an embodiment, the system may further include a tag configured to receive the interrogation signal, apply FSK modulation to the interrogation signal, and transmit a tag signal to which the FSK modulation is applied, in a direction from which the interrogation signal is incident. According to an embodiment, the interrogator may be further configured to measure a position of the tag by isolating the tag signal and identifying the FSK modulation applied to the tag signal.

According to an embodiment, the tag signal may be applied with the FSK modulation to induce periodic 180° shifts of a phase of the output interrogation signal.

According to an embodiment, the interrogation signal may belong to a millimeter-wave band.

According to an embodiment, the interrogator may be further configured to mix the interrogation signal with the tag signal to generate an intermediate signal. According to an embodiment, the interrogator may be further configured to perform a FFT on the intermediate signal.

The position measurement device and system according to the disclosure may prevent line-of-sight (LoS) signals from being distorted due to non-LoS (nLoS) signals caused by multiple paths, and identify the positions of multiple tags through frequency modulation at each tag, thereby improving the accuracy of position recognition.

A detailed example for describing an embodiment according to the disclosure is only a combination of each standard, method, detailed method, and operation, and the interrogator and tag device may perform position measurement based on backscatter in a millimeter-wave band through a combination of at least two of various techniques described above. For example, it may be possible to perform some of operations of an embodiment in combination with some of operations of another embodiment.

A machine-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment, methods according to various embodiments disclosed herein may be included in a computer program product and then provided. The computer program product may be traded as commodities between sellers and buyers. The computer program product may be distributed in the form of a machine-readable storage medium (e.g., a compact disc read-only memory (CD-ROM)), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A tag for performing position measurement based on backscatter in a millimeter-wave band, the tag comprising:
   a planar Van Atta array antenna;
   a frequency-shift keying (FSK) modulator connected to the planar Van Atta array antenna; and
   at least one bias circuit connected to the FSK modulator,
   wherein the FSK modulator is configured to:
   based on an interrogation signal being received by the planar Van Atta array antenna, modulate the interrogation signal based on a control signal supplied through the at least one bias circuit; and
   output the modulated interrogation signal in a direction from which the interrogation signal is received, through the planar Van Atta array antenna,
   wherein an incident signal received by an upper antenna is output from a lower antenna of a centrosymmetric antenna pair in the planar Van Atta array antenna,
   wherein the FSK modulator comprises a 90° hybrid coupler, the 90° hybrid coupler being configured to deliver the interrogation signal through a first path, a second path, a third path, and a fourth path,
   wherein, among the interrogation signal, a first signal delivered through the first path and a second signal delivered through the second path are induced to undergo a 180° phase shift with respect to each other to offset each other, and
   wherein, among the interrogation signal, a third signal delivered through the third path and a fourth signal delivered through the fourth path, having no phase difference therebetween, are summed up to a maximum and output.

2. The tag of claim 1, wherein the FSK modulator is further configured to perform FSK modulation by inducing periodic 180° shifts of a phase of the interrogation signal.

3. The tag of claim 1, wherein the FSK modulator further comprises:
   a reflective network connected to the 90° hybrid coupler and comprising a plurality of PIN diodes.

4. The tag of claim 1, further comprising a radio-frequency (RF) choke arranged between the at least one bias circuit and the planar Van Atta array antenna to prevent leakage of the interrogation signal received by the planar Van Atta array antenna.

5. The tag of claim 1, wherein the interrogation signal comprises continuous unit chirp signals that change from a first frequency to a second frequency.

6. The tag of claim 1, wherein the planar Van Atta array antenna comprises a plurality of antenna elements,
   the plurality of antenna elements comprise centrosymmetric antenna element pairs for retroreflection, and
   a first antenna element and a second antenna element included in each of the antenna element pairs are connected to transmission lines having a length difference equal to multiples of length $\lambda_g$ of a guided wavelength of the interrogation signal.

7. An interrogator for performing position measurement based on backscatter in a millimeter-wave band, the interrogator comprising:
   a transceiver; and
   at least one processor connected to the transceiver, wherein the at least one processor is configured to:

output an interrogation signal including continuous unit chirp signals that change from a first frequency to a second frequency;
   receive a backscattered tag signal from a tag that has received the output interrogation signal; and
   measure a position of the tag by isolating the tag signal and identifying frequency-shift keying (FSK) modulation applied to the backscattered tag signal,
   wherein the tag comprises a frequency-shift keying (FSK) modulator connected to a planar Van Atta array antenna,
   wherein an incident signal received by an upper antenna may be output from a lower antenna of a centrosymmetric antenna pair in the planar Van Atta array antenna,
   wherein the FSK modulator comprises a 90° hybrid coupler, the 90° hybrid coupler being configured to deliver the interrogation signal through a first path, a second path, a third path, and a fourth path,
   wherein, among the interrogation signal, a first signal delivered through the first path and a second signal delivered through the second path are induced to undergo a 180° phase shift with respect to each other to offset each other, and
   wherein, among the interrogation signal, a third signal delivered through the third path and a fourth signal delivered through the fourth path, having no phase difference therebetween, are summed up to a maximum and output.

8. The interrogator of claim 7, wherein the interrogation signal belongs to a millimeter-wave band.

9. The interrogator of claim 7, wherein the at least one processor is further configured to:
   mix the interrogation signal with the tag signal to generate an intermediate signal; and
   perform a fast Fourier transform (FFT) on the intermediate signal.

10. A system for performing position measurement based on backscatter in a millimeter-wave band, the system comprising:
   an interrogator configured to output an interrogation signal including continuous unit chirp signals that change from a first frequency to a second frequency; and
   a tag configured to receive the interrogation signal, apply frequency-shift keying (FSK) modulation to the interrogation signal, and transmit a tag signal to which the FSK modulation is applied, in a direction from which the interrogation signal is incident,
   wherein the interrogator is further configured to measure a position of the tag by identifying the FSK modulation applied to the tag signal,
   wherein the tag comprises a frequency-shift keying (FSK) modulator connected to a planar Van Atta array antenna,
   wherein an incident signal received by an upper antenna may be output from a lower antenna of a centrosymmetric antenna pair in the planar Van Atta array antenna,
   wherein the FSK modulator comprises a 90° hybrid coupler, the 90° hybrid coupler being configured to deliver the interrogation signal through a first path, a second path, a third path, and a fourth path,
   wherein, among the interrogation signal, a first signal delivered through the first path and a second signal delivered through the second path are induced to undergo a 180° phase shift with respect to each other to offset each other, and wherein, among the interrogation signal, a third signal delivered through the third path and a fourth signal delivered through the fourth path, having no phase difference therebetween, are summed up to a maximum and output.

11. The system of claim 10, wherein the interrogation signal belongs to a millimeter-wave band.

12. The system of claim 10, wherein the interrogator is further configured to:

mix the interrogation signal with the tag signal to generate an intermediate signal; and perform a fast Fourier transform (FFT) on the intermediate signal.

\* \* \* \* \*